United States Patent [19]

Weissel et al.

[11] 4,293,687

[45] Oct. 6, 1981

[54] TETRAALKYLATED BISCYCLOHEXYLAMINE DERIVATIVES

[75] Inventors: Oskar Weissel; Volker Serini; Hans-Josef Buysch, all of Krefeld, Fed. Rep. of Germany

[73] Assignee: Bayer Aktiengesellschaft, Leverkusen, Fed. Rep. of Germany

[21] Appl. No.: 146,842

[22] Filed: May 5, 1980

Related U.S. Application Data

[63] Continuation of Ser. No. 818,261, Jul. 22, 1977, abandoned.

[30] Foreign Application Priority Data

Jul. 22, 1976 [DE] Fed. Rep. of Germany ....... 2632956
Aug. 17, 1976 [DE] Fed. Rep. of Germany ....... 2637009

[51] Int. Cl.³ ................ C08F 12/02; C07C 83/00
[52] U.S. Cl. .................... 528/346; 564/447; 564/448; 564/452; 564/457; 564/395; 564/305
[58] Field of Search ............. 260/563 R, 563 B; 528/346; 564/447, 448, 452, 457, 395, 305

[56] References Cited

U.S. PATENT DOCUMENTS

| | | | |
|---|---|---|---|
| 2,516,585 | 7/1950 | Pease ................... | 528/346 |
| 2,606,928 | 8/1952 | Barkdoll et al. ............ | 260/563 B |
| 3,283,002 | 11/1966 | Brake ................ | 260/563 B |
| 3,564,834 | 2/1971 | Elia .................. | 528/346 X |
| 3,634,512 | 1/1972 | Poehler et al. ............ | 260/563 D |
| 3,743,677 | 7/1973 | Grosskinsky et al. ......... | 260/563 B |
| 3,840,501 | 10/1974 | Shue et al. ............. | 528/346 X |
| 4,161,492 | 7/1979 | Weissel ................ | 564/305 |

Primary Examiner—Paul F. Shaver
Attorney, Agent, or Firm—Sprung, Felfe, Horn, Lynch & Kramer

[57] ABSTRACT

New biscyclohexylamine derivatives represented by the following formula

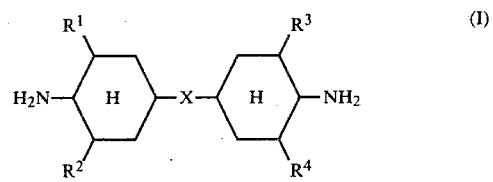

wherein
$R^1$ to $R^4$ represent identical or different alkyl groups having 1 to 6 carbon atoms;
X is a single bond,
a divalent aliphatic straight-chain or branched-chain group having from 2 to 10 carbon atoms,
a methylene group, when at least one of the substituents $R^1$ to $R^4$ has more than 1 carbon atom,
a divalent cycloaliphatic group having from 6 to 12 carbon atoms,
a divalent aliphatic straight-chain or branched-chain group with cycloaliphatic substituents having from 6 to 8 carbon atoms,
a divalent straight-chain or branched-chain dialkyl cyclohexane group having from 8 to 12 carbon atoms and a divalent straight-chain or branched-chain dialkyl benzene group having from 8 to 12 carbon atoms.

22 Claims, No Drawings

TETRAALKYLATED BISCYCLOHEXYLAMINE DERIVATIVES

This is a continuation of application Ser. No. 818,261 filed July 22, 1977 now abandoned.

This invention relates to new biscyclohexylamine derivatives and to processes for their preparation.

The invention has as its object new biscyclohexylamine derivatives represented by the following formula:

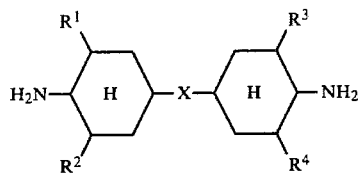

wherein
$R^1$ to $R^4$ are identical or different alkyl groups having from 1 to 6 C-atoms, and
X is a single bond,
a divalent aliphatic straight-chain or branchedchain group having from 2 to 10 C-atoms, especially alkylene, alkylidene;
a methylene group, when at least one of the substituents $R^1$ to $R^4$ has more than 1 C-atom,
a divalent cycloaliphatic group having from 6 to 12 C-atoms e.g. cycloalkylene, cycloalkylidene,
a divalent aliphatic straight-chain or branched-chain group with cycloaliphatic substituents e.g. cycloalkyl substituents having from 6 to 8 C-atoms,
a divalent straight-chain or branched dialkyl cyclohexane group having from 8 to 12 C-atoms e.g. cyclohexylene, perhydroxylylene, α-substituted perhydroxylylene and a divalent straight-chain or branched-chain dialkyl benzene group having from 8 to 12 C-atoms.

The invention has as its preferred object new biscyclohexylamine derivatives represented by formula (I) wherein
$R^1$ to $R^4$ are identical or different alkyl groups having from 1 to 6 C-atoms, and
X is a single bond,
a divalent aliphatic straight-chain or branched-chain group having from 2 to 5 C-atoms,
a methylene group, when at least one of the substituents $R^1$ to $R^4$ has more than 1 C-atom,
a divalent cycloaliphatic group having 6 C-atoms,
a divalent aliphatic group with cycloaliphatic substituents having 7 or 8 C-atoms and a divalent branched-chain dialkyl benzene group having from 10 to 12 C-atom The invention has as its most preferred object new biscyclohexylamine derivatives represented by formula (I) wherein
$R^1$ to $R^4$ are identical or different alkyl groups having from 1 to 3 C-atoms, and
X is a single bond,
a divalent aliphatic straight-chain or branched-chain group having from 2 to 4 C-atoms, when $R^1$ to $R^4$ is a methyl group,
a methylene group, when at least one of the substituents $R^1$ to $R^4$ has more than 1 C-atom,
a cyclohexylidene group,
a divalent aliphatic group with cycloaliphatic substituents having 7 or 8 C-atoms and a divalent straight-chain or branched-chain dialkyl benzene group having from 10 to 12 C-atoms.

The following biscyclohexylamine derivatives are given as examples:
bis(3,5-dimethyl-4-aminocyclohexyl); 1-(3,5)-dimethyl-4-aminocyclo-hexyl-1-(3'5'-diethyl-4'-aminocyclohexyl)-propane; 1,1-bis-(3,5-dimethyl-4-aminocyclohexyl)-ethane; 1,1-bis-(3,5-diethyl-4-aminocyclohexyl)-ethane; 1,1-bis-(3,5-dimethyl-4-aminocyclohexyl)-propane; 2,2-bis-(3,5-dimethyl-4-aminocyclohexyl)-propane; 1,1-bis-(3,5-dimethyl-4-aminocyclohexyl)-butane; 2,2-bis-(3,5-dimethyl-4-aminocyclohexyl)-butane; 1,3-bis-(3,5-dimethyl-4-aminocyclohexyl)-3-methyl butane; 1,3-bis-(3,5-dimethyl-4-aminocyclohexyl)-butane; 1,3-bis-(3,5-dimethyl-4-aminocyclohexyl)-cyclopentane; 1,1-bis-(3,5-dimethyl-4-aminocyclohexyl)-cyclohexane; 1,1-bis-(3,5-dimethyl-4-aminocyclohexyl)-cyclododecane; bis-(3,5-dimethyl-4-aminocyclohexyl)-phenyl methane; bis-(3,5-dimethyl-4-aminocyclohexyl)-cyclohexyl methane; α,α'-bis-(3,5-dimethyl-4-aminocyclohexyl)-p-xylene; α,α'-bis-(3,5-dimethyl-4-aminocyclohexyl)-m-xylene; α,α'-bis-(3,5-dimethyl-4-aminocyclohexyl)-p-diisopropyl benzene; α,α'-bis-(3,5-dimethyl-4-aminocyclohexyl)-m-diisopropyl benzene; bis-(3,5-diethyl-4-aminocyclohexyl)-methane; bis-(3,5-diisopropyl-4-aminocyclohexyl)-methane.

The invention also has as its object a process for the preparation of biscyclohexylamine derivatives represented by the following formula:

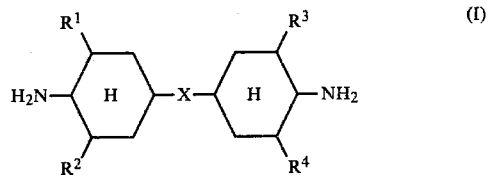

wherein
$R^1$ to $R^4$ are identical or different alkyl groups having from 1 to 6 C-atoms, and
X is a single bond,
a divalent aliphatic straight-chain or branched-chain group having from 1 to 10 C-atoms,
a divalent aliphatic group having from 6 to 12 C-atoms,
a divalent aliphatic straight-chain or branched-chain group with cycloaliphatic substituents having from 6 to 8 C-atoms,
a divalent straight-chain or branched-chain dialkylcyclohexane group having from 8 to 12 C-atoms and a divalent straight-chain or branched-chain dialkyl benzene group having from 8 to 12 C-atoms,
in which process biscyclohexanol derivatives represented by the following formula:

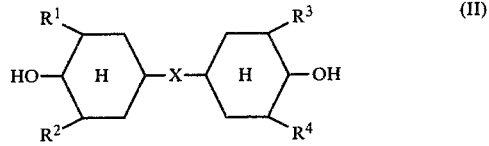

wherein $R^1$ to $R^4$ and X have the meaning indicated above, are reacted with ammonia at elevated temperature and pressure in the presence of nickel/chromium based hydrogenation catalysts and hydrogen.

The biscyclohexanol derivatives of the formula (II) used as starting materials for the process according to the invention are easily obtainable by catalytic hydrogenation of the corresponding bisphenols according to German Pat. No. 2,434,966. They may be reacted either in the pure form or as the crude product, that is to say in the form in which they are obtained after hydrogenation of the bisphenols. According to a preferred embodiment of the process therefore, a hydrogenation product obtained by catalytic hydrogenation of a bisphenol represented by the following general formula:

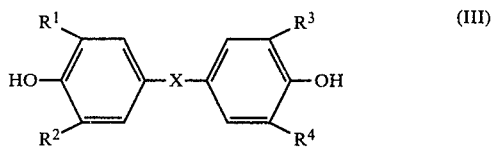

wherein $R^1$ to $R^4$ and X have the meaning already indicated, in the presence of a nickel/chromium based hydrogenation catalyst is used as starting material and, after hydrogenation, is reacted with ammonia in the same reaction vessel in the presence of the hydrogenation catalyst previously used after most of the excess hydrogen used in the hydrogenation reaction has been discharged.

The ammonia may suitably be used in its anhydrous form in the process according to the invention.

The ammonia and biscyclohexanol derivative are generally used in a molar ratio of from 3:1 to 30:1, in particular from 4:1 to 16:1. Under these conditions, the ammonia partial pressure is maintained in the range of from 150 to 500 bar, in particular from 200 to 300 bar, during the reaction. To accelerate the reaction and to achieve high conversion yields and avoid a large excess of ammonia, it may be advantageous if the water formed in the reaction is removed in the course of the reaction and the partially reacted product is reacted afresh with anhydrous ammonia.

The reaction according to the invention is carried out in the presence of hydrogen in order to prevent partial dehydrogenation processes and to maintain the activity of the catalyst. The hydrogen partial pressure may be from 5 to 50 bar, in particular from 10 to 30 bar.

The reaction temperature required depends, of course, on the nature of the substituents $R^1$ to $R^4$ and X, and can be quickly determined by a preliminary test in each case. Relatively high reaction temperatures are generally required because the OH groups which are required to be replaced are powerfully hindered by the substituents in the ortho position.

According to the invention, therefore, the reaction is carried out at temperatures of from 180° to 300° C., in particular from 210° to 280° C. and preferably from 230° to 270° C.

It is however not always necessary to prepare the starting bisphenols in a separate process stage, and then to conduct hydrogenation. The present invention in many cases allows the synthesis of the desired diamines in an "all-in-one" process starting from the corresponding 2,6-dialkylphenols without isolation and purification of the intermediate products. This must be described as being a surprising result, since it is known that hydrogenation catalysts can be extraordinarily easily poisoned by the slightest traces of secondary products. This process is particularly advantageous because there is no need for working up steps accompanied by the inevitable losses in yield and the complex technical requirements.

For example, 4,4'-diamino-3,3'-5,5'-tetraalkyldicyclohexylmethanes of the general formula

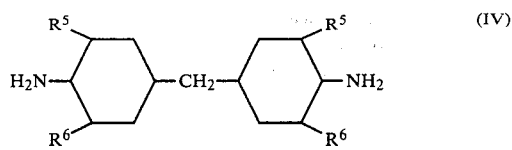

wherein $R^5$ and $R^6$ can be identical or different and are alkyl groups having 1 to 6 C-atoms are obtained by (a) condensing at least 1.8 mols of 3,6-dialkylphenols with 1 mol formaldehyde in the presence of oxalic acid, separating off the water, (b) hydrogenating the condensation product without isolation and without purification in the presence of a nickel/chromium based catalyst and (c) reacting the hydrogenation product with ammonia, again without isolation and purification, the water that is formed during the reaction being, optionally, removed.

The three reaction steps can thus be conducted directly after each other in the same reactor. Intermediate isolation and purification is not necessary.

The following diamines are preferably obtained by the process according to the invention:

4,4'-diamino-3,3',5,5'-tetraisopropyl dicyclohexyl methane;

4,4'-diamino-3,3',5,5'-tetraisoethyl dicyclohexyl methane and 4,4'-diamino-3,3'-diethyl-5,5'-dimethyl dicyclohexyl methane 4,4'-diamino-3,3',5,5'-tetramethyl dicyclohexyl methane is particularly preferred.

In detail, the following procedure is followed:

In the first reaction step (condensation) formaldehyde in gaseous or solid form, for example as paraformaldehyde, is added to the dialkyl phenol, without it being necessary to remove the water resulting during the course of the reaction. It is however simpler and more advantageous for the course of the reaction to use aqueous formaldehyde solutions. These normally have a content of a maximum of 50% by weight, preferably up to 35% by weight, of formaldehyde.

The molar ratio of dialkyl phenol to formaldehyde normally amounts to between 2:1 and 5:1, preferably between 2:1 and 3.5:1. However, it is also possible to use a larger excess of phenol. It is even possible to use an excess of formaldehyde as reflected, for example, in a molar ratio of 1.8:1. The oxalic acid is used in a quantity of 0.1 to 5% by weight, preferably in a quantity of from 0.2 to 3% by weight and, with particular preference, in a quantity of from 0.5 to 2% by weight, based on the reaction mixture as a whole.

Since tetraalkyl bisphenols can crystallise out during the condensation reaction, above all in cases where a small excess, if any, of dialkyl phenol is used, the reaction mixture should best be diluted by the addition of a diluent, preferably water, to ensure that it remains stirrable.

The temperature in the first stage of the reaction is between 60° and 170° C., preferably between 80° and 160° C. and more especially between 90° and 150° C.

After condensation of the 2,6-dialkyl phenols, the water and, optionally, excess dialkyl phenol is distilled off, for which purpose the pressure may be reduced and the sump finally heated to a temperature of up to 250° C., preferably in the range from 220° to 230° C., in order to decompose quantitatively the oxalic acid.

Hydrogenation catalysts based on nickel/chromium are then added to the sump and hydrogenation carried out at temperatures of from 130° to 240° C., preferably at temperatures of from 160° to 230° C., and under pressures of from 100 to 350 bars, preferably from 170 to 220 bars. The hydrogenation reaction is generally complete after 1 to 3 hours.

In order to avoid partial dehydrogenation and to keep the activity of the catalyst intact, the following reaction with ammonia is, according to the invention, carried out under a hydrogen partial pressure of from 5 to 50 bars, preferably from 10 to 30 bars.

On completion of hydrogenation, therefore, the hydrogen pressure is reduced to this pressure range and ammonia added, preferably in anhydrous form.

In general, ammonia and the 4,4'-dihydroxy-3,3',5,5'tetraalkyl dicyclohexyl methane are used in a molar ratio of from 3:1 to 30:1 and more especially in a molar ratio of from 4:1 to 16:1. During the reaction the ammonia pressure is kept at 150 to 500 bars and preferably at 200 to 300 bars. In order to accelerate the reaction, to obtain high conversions and to avoid large excesses of ammonia, it is best to remove the water formed during the reaction and to re-react the partially reacted product with anhydrous ammonia.

In this stage of the reaction, the reaction temperature is in the range from 180° to 300° C., preferably in the range from 210° to 280° C. and more especially in the range from 230° to 270° C.

According to the invention, the reaction is carried out in the presence of hydrogenation catalysts which are based on nickel/chromium and may also contain other constituents such as, for example, Mg, Ba, Cu, Zn, Al, Si, Th or Mn.

These catalysts may be prepared by known methods, for example according to German Pat. No. 889,591 by mutual precipitation of sparingly soluble Ni and Cr and, where indicated, also the precipitates containing the elements Mg, Ba, Cu, Zn, Al, Si, Th and Mn from their aqueous salt solutions by means of sodium hydroxide solution.

Other precipitating agents may be used instead of sodium hydroxide solution, for example ammonia, alkali metal carbonates or alkali metal bicarbonates (see Houben-Weyl, Volume 4/2, page 137 et seq.; Handbuch der Katalyse, Volume V, Het.Kat. II, page 412 et seq.). Alkali metal silicates may also be used as precipitating agents if the catalysts contain silicon.

The chromium compound may be used not only as a chromium (III) salt but also in its hexavalent form (see, for example, Handbuch der Katalyse, Volume VII, first half, page 674, or Houben-Weyl, Volume 4/2, page 179), and this chromium compound, for example in the form of ammonium bichromate, may be reacted with the previously formed and washed precipitate containing Ni and optionally also Cu, Mg, Ba, Zn, Al, Si, Th or Mn at elevated temperature in an aqueous medium (see, for example, German Pat. No. 2,049,809, page 4).

The precipitates obtained in this way are dried in the usual manner and before use they are reduced with hydrogen at an elevated temperature, preferably in the range of from 180° to 450° C.

The hydrogenation catalysts based on Ni-Cr used according to the invention are characterised in that the atomic ratio of Ni to Cr in these catalysts is from 1:0.1 to 1:0.5.

Biscyclohexylamines of formula (I) are obtained in excellent yields from the reaction according to the invention of biscyclohexanol derivatives of formula (II) with ammonia in the presence of the above mentioned hydrogenation catalysts.

Such a smooth reaction was not to be expected since it is known that cycloaliphatic amines tend to undergo condensation reactions to a considerable extent in the presence of Ni-Cr catalysts even at temperatures below 200° C. (German Pat. No. 904,529, Example 2) which is the reason why, for example Ni-Cr catalysts are not suitable for the preparation of primary cycloaliphatic amines from the corresponding aromatic amines.

It is surprisingly found that these unwanted condensation reactions are completely suppressed in the preparation according to the invention of biscyclohexylamine derivatives.

The smooth course of the reaction was particularly unexpected in view of the fact that the reaction according to the invention is carried out at relatively high temperatures.

The reaction may be carried out either continuously or discontinuously.

In the discontinuous method, the process according to the invention is carried out batchwise in an autoclave, excess ammonia and water of reaction being preferably blown off after termination of the main reaction, the remaining autoclave contents then being reacted afresh with anhydrous ammonia. Anhydrous ammonia can then be recovered from the aqueous ammonia in the usual manner, for example by distillation under pressure (see Ullmann, Volume 3, pages 458–459).

The continuous method of the process according to the invention may be carried out, for example, in a trickle phase. In that case, the biscyclohexanol derivative together with excess ammonia is passed over the stationary catalyst placed in lumps in several vertical reactors arranged in series. Depressurising stages are preferably provided between the reactors for removal of the ammonia and water of reaction. After separation of the water of reaction by pressure distillation, the ammonia is added to the next reactor together with the reaction mixture.

The biscyclohexylamine derivatives obtained by these methods can in many cases be used without further purification. Where necessary, a purification stage comprising distillation may be added.

The new amines are valuable intermediate products for the production of polycondensation resins and lacquers such as polyureas, polyamides and polyurethanes. Polyurethane resins obtained in this way are particularly distinguished by their greater resistance to hydrolysis, increased temperature resistance and low tendency to crystallisation compared with known synthetic resins.

The polyamides produced from these new amines are also of particular interest. They are distinguished by their excellent hardness, high modulus of elasticity, high transparency, high temperature resistance, low water absorption, improved solubility in the usual organic solvents and excellent electrical properties. For example, they have a low dielectric loss factor and a high tracking resistance.

In the lacquer sector, they are particularly suitable owing to the lightness of their colour and their high resistance to yellowing. Their resistance to degradation by powerful chemical agents should also be particularly mentioned.

The preparation of the polyamides is conducted according to known methods, for example as in the case of the 6,6-polyamide, by means of polycondensation of the biscyclohexylamines of the Formula I with aliphatic and/or aromatic dicarboxylic acids, using, if appropriate, as cocomponents aliphatic aminocarboxylic acids and/or aliphatic cyclic acid amides and/or aliphatic and/or cycloaliphatic diamines, this polycondensation is conducted with the mixture being in a melted state at temperatures in the range of approximately 200° C. to 320° C., preferably at 240°–300° C. Another known method comprises reacting aliphatic and/or aromatic dicarboxylic acid chlorides with the biscyclohexylamines of the Formula I according to the solution process or the phase bondary process, at approximately −10°–50° C., preferably at 0°–20° C. These processes are described in, for example, Viewig/Miller Kunststoffhandbuch (Plastics Manual), Vol. 6, Polyamides, page 60 et seq. and page 168 et seq.

The aliphatic and/or aromatic dicarboxylic acids which can be used are these containing up to 16 C-atoms, preferably up to 14 C-atoms.

The following can be named as examples of aliphatic dicarboxylic acids which can be used: adipic acid, sebacic acid, decane dicarboxylic acid, dodecane dicarboxylic acid, azelaic acid. Examples of aromatic dicarboxylic acids are: terephthalic acid, isophthalic acid.

The acid chlorides to be used for the solution process or the boundary surface process are derived from the abovementioned aliphatic and aromatic dicarboxylic acids.

The aliphatic amino carboxylic acids which can be used are those with up to 14, preferably up to 12 C-atoms, such as $\epsilon$-amino caproic acid, 11-amino undecanoic acid, $\omega$-amino lauric acid.

The aliphatic cyclic acid amides which can be used are those with up to 14, preferably up to 12 C-atoms, such as caprolactam and lauric lactam.

The aliphatic and/or cycloaliphatic diamines which can be used are those with up to 20 C-atoms, preferably up to 16 C-atoms, such as hexamethylene diamine, trimethylhexamethylene diamine, isophorone diamine, bis-(4-aminocyclohexyl-)-methane, bis-(4-aminocyclohexyl-)propane.

The preparation of the polyurethanes can for example be conducted by the process of bonndary surface polycondensation or by reacting the bis-cyclohexylamines with bifunctional carbonic acid derivatives, such as is described in Houben-Weyl, Methoden der Organischen Chemie, Makromolekulare Stoffe (Methods of organic chemistry, macromolecular materials), Part 2, Georg Thieme Verlag, Stuttgart 1963, page 95 et seq.

The preparation of polyureas is conducted for example by reacting bis-cyclohexylamines and carbon dioxide or carbonic acid ester under high pressure at 180°–250° C., by reacting the diamines with bisurethanes whereby the alcohol is split off in the presence of solvents or by polyaddition of the diamines with diisocyanates in the presence of solvents containing hydroxy groups or with the aid of bonndary surface polycondensation as is described in Houben-Weyl, Methoden der Organischen Chemie, Makromolekulare Stoffe, Part 2, Georg Thieme Verlag, Stuttgart 1963, page 165 et seq.

The relative viscosities of the polyamides are within the range of approximately 1,6–4,0 measured in m-cresol, 1% strength, at 25° C., in an Ubbelohde viscometer. The polyamides are able to be used for the production of fibres, films, sheets, pipes, moulded sections.

The polyurethanes and polyureas are able to be used for the production of foils, fibres and pretective coverings.

EXAMPLE 1

4000 g of bis-(3,5-dimethyl-4-hydroxy phenyl)-methane are hydrogenated in a 9.4 liter autoclave with 112 g of a Ni-Cr-Al-Cu catalyst (atomic ratio Ni:Cr=1.0:0.27) which has previously been reduced with hydrogen at 390° C. Hydrogenation in the autoclave is carried out at 150°–190° C. and within a pressure range of from 200–280 bar until absorption of hydrogen ceases. The pressure is then reduced to 15 bar. Approximately 1800 g of $NH_3$ are then pumped into the autoclave with a high pressure pump while the temperature is raised to 260° C. When this temperature is reached, the pressure should be approximately 260 bar. The mixture is continuously stirred at 260° C. until the pressure ceases to fall (approximately 240 minutes). The ammonia and water of reaction are then blown off and the reaction is completed at 260° C. and approximately 260 bar (for about 240 minutes) after about 1400–1500 g of fresh ammonia have been pumped in.

The reaction mixture is cooled to 150° C. and at the same time ammonia and water of reaction are blown off.

The liquid reaction product is then filtered and distilled.

3990 g of bis-(3,5-dimethyl-4-aminocyclohexyl)-methane are obtained as a colourless liquid.

Yield: 96.0% of the theoretical amount.

B.p.: 132°–135° C./0.1 Torr.

EXAMPLE 2

830 g of bis-(3,5-dimethyl-4-hydroxyphenyl)-methane are hydrogenated in a 2 liter autoclave with 19.0 g of a Ni-Cr-Ba-Zn catalyst (atomic ratio Ni:Cr=1.0:0.30) which has previously been reduced with hydrogen at 380° C. Hydrogenation is carried out at 170°–215° C. within a pressure range of 250°–280° C. until absorption of hydrogen ceases. The excess hydrogen is then reduced to a pressure of 20 bar. 395 g of ammonia are pumped into the autoclave to a total pressure of 290 bar while the temperature is raised to 260° C.

After a reaction time of 4 hours (degree of conversion 86%), ammonia and water of reaction are blown off, 400 g of fresh ammonia are pumped in and the reaction is continued for 4 hours at 260° C.

845 g of bis-(3,5-dimethyl-4-aminocyclohexyl)-methane are obtained when the reaction product is worked up as described in Example 1.

Yield: 96.9% of the theoretical yield.

B.p.: 154°–156°/0.7 Torr.

EXAMPLE 3

4000 g of 2,2-bis-(3,5-dimethyl-4-hydroxyphenyl)-propane and 112 g of a Ni-Cr-Al-Cu catalyst (Ni/Cr=1/0.27) which has previously been reduced with hydrogen at 380° C. are stirred in a 9.4 liter autoclave at a hydrogen pressure of 250–280 bar and a temperature of 210° C. until absorption of hydrogen ceases (time: 160 minutes).

Excess hydrogen is blown off until the pressure is reduced to 20 bar. About 1620 g of ammonia are then pumped into the autoclave until the total pressure reaches 270 bar while the temperature is raised to 260° C.

After a reaction time of 4 hours, ammonia and water of reaction are blown off at 150° C. and fresh ammonia is then pumped in (about 1250 g) up to a pressure of 270 bar at 260° C. This process is repeated once more after a reaction time of 4 hours at 260° C. and the reaction is stopped after a further 4 hours. $NH_3$ and water of reaction are blown off at about 150° C. and the reaction product is then further cooled, taken up in methanol, filtered and distilled. 4044 g of 2,2-bis-(3,5-dimethyl-4-aminocyclohexyl)-propane are obtained as a viscous liquid.

Yield: 97.6% of the theoretical yield.
B.p.: 156°–160°/0.3–0.4 Torr.

EXAMPLE 4

332 g of 1,1-bis-(3,5-dimethyl-4-hydroxyphenyl)-butane(n) are stirred in a 1 liter autoclave at 180°–220° C. under a hydrogen pressure of 200–280 bar in the presence of 23 g of a Ni-Cr-Al-Cu catalyst (Ni:Cr=1.0:0.27) which has previously been reduced with hydrogen at 380° C. Hydrogenation is continued until absorption of hydrogen ceases.

The autoclave pressure is then released down to 15 bar.

About 190 g of $NH_3$ are then pumped in while the temperature is raised to 260° C. until a total pressure of 290 bar is reached. After a reaction time of 5 hours at 260° C., unreacted $NH_3$ and water of reaction are blown off over a temperature range of from 200°–150° C. The autoclave contents are first adjusted to a partial hydrogen pressure of 20 bar. The temperature is then raised to 260° C. and at the same time about 220 g of $NH_3$ are pumped in until the total pressure reaches 290 bar. Stirring is continued for 5 hours at 260° C. and the pressure is then released while the autoclave contents are cooled to 150° C. The reaction product is taken up with methanol under continued cooling and filtered, and the solvent is distilled off.

329 g of crude 1,1-bis-(3,5-dimethyl-4-aminocyclohexyl)-butane-(n) are obtained as a reaction product which forms a colourless, viscous oil when distilled at 150°–158° C./0.2 Torr.

Refractive index: $n_D^{25}$:1.4990.

EXAMPLE 5

When 362 g of 1,1-bis-(3,5-dimethyl-hydroxyphenyl)-ethane are reacted in the presence of 25 g of reduced Ni-Cr-Al-Cu catalyst in a manner analagous to Example 2, first with hydrogen at 215° C. and 200–280 bar and then twice with 220 g portions of $NH_3$ at 260° C. at a pressure range of 260–280 bar and a hydrogen partial pressure of 15 bar, 365 g of crude dimethyl-4-aminocyclohexyl-ethane are obtained as a reaction product.

Distillation of the crude product yields the pure compound consisting of a colourless, viscous oil.

B.p.: 135°–140° C./0.2 Torr.
Refractive index $n_D^{25}$:1.4978.

EXAMPLE 6

(a) A vigourously stirred mixture of 976 g (8 mols) of 2,6-dimethyl phenol, 215 g (2.5 mols) of 35% formalin and 10 g of oxalic acid is heated under nitrogen for 2 to 3 hours until it boils and is kept at boiling temperature for 16 to 17 hours. Thereafter, there is hardly any more formaldehyde present in the reaction mixture. Water is then distilled off under normal pressure, after which the sump temperature is increased, the pressure adjusted to approximately 100 Torr and 2,6-dimethyl phenol separated off. At increasing sump temperatures of >150° C., the pressure is successively further reduced until finally, at 180° to 190° C./10 to 20 Torr, no more dimethyl phenol distils over. The sump is poured out under nitrogen and allowed to harden. 627 g of 4,4'-dihydroxy-3,5,3',5'-tetramethyl diphenyl methane are obtained in the form of yellowish crystals, corresponding to a yield of 98% of the theoretical, based on the the formaldehyde used (melting point 168°–173° C.).

(b) 627 g of crude bis-(3,5-dimethyl-4-hydroxy phenyl)-methane according to (a) are shaken in a shaker-type autoclave in the presence of 15 g of a reduced Ni-Cr-Al-Cu catalyst at 160°–170° C. under a hydrogen pressure of 200–280 bars until no more hydrogen is taken up (time: 145 minutes).

(c) After venting to 15 bars, 270 g of ammonia are pumped into the autoclave by a high pressure pump while the temperature is increased to 260° C. After this temperature is reached, the pressure should amount to approximately 260 bars. The mixture is stirred at 260° C. until there is virtually no further reduction in pressure (approximately 240 minutes), after which ammonia and water of reaction are blown off and the reaction is completed at 260° C./260 bars after approximately 210 g of ammonia have been pumped in and the hydrogen pressure has been adjusted to 20 bars (time: approx. 250 minutes). Ammonia and water are blown off while cooling to 150° C.

The liquid reaction product is filtered and distilled, giving 613 g of 4,4'-diamino-3,3',5,5'-tetramethyl-dicyclohexyl methane in the form of a colourless liquid ($bp_{0.1}$ 132° to 135° C.), corresponding to a yield of 94% of the theoretical, based on the bisphenol and to 92% of the theoretical based on the 2,6-dimethyl phenol used. The basic nitrogen content of the product, as determined by acid-base titration, amounts to 10.3% (calculated 10.5%).

EXAMPLE 7

A mixture of 1800 g (14.75 mols) of 2,6-dimethyl phenol, 475 g (5.52 mols) of 35% formalin and 40 g of oxalic acid is stirred for 10 hours under nitrogen at 110° to 120° C. in an autoclave, after which water and excess dimethyl phenol are distilled off and, finally, the sump brought to a temperature of 220° C. and kept at that temperature for 30 minutes. 35 g of a catalyst containing Nr, Cr, Zn and Ba in an atomic ratio of 1.0:0.30:0.02:0.1 are then added under an inert gas, hydrogen is introduced under pressure, hydrogenation is carried out for one hour at 180° to 210° C./200 to 280 bars until the uptake of hydrogen is over, the pressure is reduced to 18 bars and 600 g of ammonia are pumped in. The reaction mixture is kept at 260° C./260 to 280 bars for 5 hours, the pressure carefully reduced to distil off the water of reaction, another 600 g of ammonia are pumped in and the amination process is repeated. After the ammonia has been removed and the catalyst filtered off, 1445 g of a yellowish oil are obtained as crude product, corresponding to a yield of 98% of the theoretical, with a basic nitrogen content, as determined by acid-base titration, of 10.2% (calculated for 4,4'-diamino-3,3',5,5'-tetramethyl dicyclohexyl methane: 10.5%). Purification by distillation gives 1406 g of colourless diamine, corresponding to a yield of 95% of the theoretical.

EXAMPLE 8

A mixture of 610 g (5 mols) of 2,6-dimethyl phenol, 215 g (2.5 mols) of 35% formalin and 20 g of oxalic acid is stirred under nitrogen for 12 hours at 110° C. in an autoclave. During the reaction of a total of 300 to 400 ml of water is pumped in to keep the mixture stirrable. Thereafter 25 g of unreacted 2,6-dimethyl phenol are distilled off with the water, corresponding to a conversion of 96% and the sump brought to a temperature of 220° C. Following the addition of 18 g of a catalyst of Ni, Cr, Ba, Mg, Th and Cu in an atomic ratio of 1.0:0.38:0.09:1.20:0.02:0.005, hydrogenation and amination are carried out in the same way as in Example 2, 250 g of ammonia being pumped in on each occasion.

The yield of diamine after distillation amounts to 93% of the theoretical.

EXAMPLE 9

When 100 g of 2,2-bis-(3,5-dimethyl-4-hydroxyphenyl)-butane are reacted in the presence of 5.6 g of reduced Ni-Cr-Al-Cu catalyst in a manner analogous to Example 5, first with hydrogen at 210°–230° C. and 250–280 bar and then, optimally for 4 hours each time, with about 220 g of $NH_3$ at 200° C. under a hydrogen partial pressure of 20 bar and a total pressure of 270–290 bar, distillation of the crude reaction product yields 76 g of 2,2-bis-(3,5-dimethyl-4-aminocyclohexyl)-butane in the form of a viscous liquid.

B.p.: 140° C./0.1 Torr.

Refractive index $n_D^{26}$: 1.5041.

Further processing to polyurethanes (A) Bischlorocarbonic acid ester of 2,2-bis-(4-hydroxyphenyl)-propane; 2,2-bis-(4-aminocyclohexyl)-propane; 0.069 ml (0.0005 mol) of triethylamine.

(B) Bischlorocarbonic acid ester of 2,2-bis-(4-hydroxyphenyl)propane; 2,2-bis-(3,5-dimethyl-4-aminocyclohexyl)-propane; 0.139 ml (0.001 mol) of triethylamine.

(C) Bischlorocarbonic acid ester of 2,2-bis-(3,5-dimethyl-4-hydroxyphenyl)-propane; 2,2-bis-(4-aminocyclohexyl)-propane; 0.069 ml (0.0005 mol) of triethylamine.

(D) Bischlorocarbonic acid ester of 2,2-bis-(3,5-dimethyl-4-hydroxyphenyl)-propane; 2,2-bis-(3,5-dimethyl-4-hydroxycyclohexyl)-propane; 0.139 ml (0.001 mol) of triethylamine.

Four different polyurethanes were prepared from the compounds mentioned under (A)–(D) according to the following method:

8 g (0.2 mol) of NaOH were dissolved in 266 g of water. The solution was cooled to 25° C. 0.05 mol of the diamine dissolved in 133 g of $CH_2Cl_2$ followed by 0.05 mol of the bischlorocarbonic acid ester dissolved in 133 g of $CH_2Cl_2$ were added with stirring. Triethylamine was added after 2 minutes stirring and the mixture was stirred for a further 15 minutes at 25° C. The diphasic mixture was already highly viscous after a few minutes. This shows that reaction to the polyurethane proceeds very rapidly. The diphasic mixture was diluted with $CH_2Cl_2$ and the aqueous phase was separated off. The organic phase was acidified with $H_3PO_4$ (diluted) and washed free from electrolytes with water. The polyurethane was obtained by evaporation of the $CH_2Cl_2$.

Polyurethanes having the following relative viscosities (determined by $CH_2Cl_2$, 0.5 g in 100 ml of solution, 25° C.) were obtained from the reaction mixtures:

(A) $\eta_{rd} = 1.75$
(B) $\eta_{rd} = 1.78$
(C) $\eta_{rd} = 1.81$
(D) $\eta_{rd} = 1.62$ Films were drawn from the methylene chloride solutions. The films were used to test the properties of the polyurethanes. It was found that polyurethanes obtained from tetramethyl-substituted 2,2-bis-(4-aminocyclohexyl)-propane have a greater resistance to hydrolysis in the presence of water, acids and bases, a higher temperature resistance, a higher solubility in organic solvents and a lower tendency to crystallisation than those obtained from unsubstituted 2,2-bis-(4-aminocyclohexyl)-propane and other polyurethanes.

EXAMPLE 10

Polyamide from 2,2-bis-(3,5-dimethyl-4-aminocyclohexyl)-propane and adipic acid.

44.17 g (0.15 mols)2,2-bis-(3,5-dimethyl-4-aminocyclohexyl)-propane and 21.92 g (0.15 mols) adipic acid are melted at 200° C. under $N_2$. The starting mixture is then heated up in 40 minutes from 200° C. to 270° C. During the heating-up and the subsequent condensation period of 7 hours at 270° C. $H_2O$ is separated off. A polyamide melt is obtained which is, at 270° C., highly viscous, transparent and colourless. The cooled polyamide is a transparent thermoplastic having a melting point of 255° C. on the "Kofler-Bank" (Kofler table). It has a relative viscosity $\eta_{rel} = 2.03$ (Ubbelohde viscosometer, 1% strength, solution in m-cresol at 25° C.). Test specimens of the polyamide exhibited resistance to boiling water.

EXAMPLE 11

Copolyamide from 2,2-bis-(3,5-dimethyl-4-aminocyclohexyl)-propane, isophthalic acid and caprolactam.

29.45 g (0.1 mols) 2,2-bis-(3,5-dimethyl-4-aminocyclohexyl)-propane, 16.61 g (0.1 mols) isophthalic acid, 22.86 g caprolactam (35% by weight) based on the finished copolyamide) are melted at 200° C. under $N_2$. Then the mixture is heated up in 40 minutes from 200° C. to 270° C. During the heating-up and the subsequent condensation period of 7 hours at 270° C. $H_2O$ is split off and distilled off.

A copolyamide melt is obtained which is, at 270° C., viscous, transparent and colourless. The cooled polyamide is a transparent thermoplastic having a melting point of 216° C. on the "Kofler-Bank" (Kofler table). The relative viscosity is $\eta_{rel} = 2,31$ (Ubbelohde viscometer, 1% strength solution in m-cresol at 25° C.). The test specimens of the polyamide exhibit resistance to boiling water.

What is claimed is:

1. A biscyclohexylamine having the formula

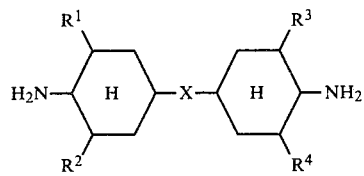

wherein:

$R^1$ to $R^4$ each represents identical or different alkyl groups having 1 to 6 carbon atoms;

X represents a single bond, a divalent straight-chain or branched-chain aliphatic group having from 2 to 10 carbon atoms, a methylene group, when at least one of said substituents R¹ to R⁴ has more than 1 carbon atom,
a divalent cycloaliphatic group having from 6 to 12 carbon atoms,
a divalent aliphatic straight or branched chain group with cycloaliphatic substituents having from 6 to 8 carbon atoms,
a divalent straight-chain or branched-chain dialkyl cyclohexane group having from 8 to 12 carbon atoms and a divalent straight-chain or branched-chain dialkyl benzene group having from 8 to 12 carbon atoms.

2. A biscyclohexylamine according to claim 1 wherein
R¹ to R⁴ are identical or different alkyl groups having from 1 to 3 carbon atoms,
X is a single bond,
a divalent aliphatic straight-chain or branched-chain group having from 2 to 4 carbon atoms, when R¹ to R⁴ is a methyl group,
a methylene group, when at least one of the substituents R¹ to R⁴ having more than 1 carbon atom,
a cyclohexylidene group,
a divalent aliphatic group with cycloaliphatic substituents having 7 or 8 carbon atoms and a divalent straight-chain or branched-chain dialkyl benzene group having from 10 to 12 carbon atoms.

3. A biscyclohexylamine selected from the group consisting of bis(3,5-dimethyl-4-aminocyclohexyl); 1-(3,5)-dimethyl-4-aminocyclohexyl-1-(3'5'-diethyl-4'-aminocyclohexyl)propane; 1,1-bis-(3,5-dimethyl-4-aminocyclohexyl)-ethane; 1,1-bis-(3,5-diethyl-4-aminocyclohexyl)-ethane; 1,1-bis-(3,5-dimethyl-4-aminocyclohexyl)-propane; 2,2-bis-(3,5-dimethyl-4-aminocyclohexyl)-propane; 1,1-bis-(3,5-dimethyl-4-aminocyclohexyl)-butane; 2,2-bis-(3,5-dimethyl-4-aminocyclohexyl)-butane; 1,3-bis-(3,5-dimethyl-4-aminocyclohexyl)-3-methyl butane; 1,3-bis-(3,5-dimethyl-4-aminocyclohexyl)-butane; 1,3-bis-(3,5-dimethyl-4-aminocyclohexyl)-cyclopentane; 1,1-bis-(3,5-dimethyl-4-aminocyclohexyl)-cyclohexane; 1,1-bis-(3,5-dimethyl-4-aminocyclohexyl)-cyclododecane; bis-(3,5-dimethyl-4-aminocyclohexyl)-phenyl methane; bis-(3,5-dimethyl-4-aminocyclohexyl)-cyclohexyl methane; α,α'-bis-(3,5-dimethyl-4-aminocyclohexyl)-p-xylene; α,α'-bis-(3,5-dimethyl-4-aminocyclohexyl)-m-xylene; α,α'-bis-(3,5-dimethyl-4-aminocyclohexyl)-p-diisopropyl benzene; α,α'-bis-(3,5-dimethyl-4-aminocyclohexyl)-m-diisopropyl benzene; bis-(3,5-diethyl-4-aminocyclohexyl)-methane and bis-(3,5-diisopropyl-4-aminocyclohexyl)-methane.

4. A biscyclohexylamine according to claim 1 which is 2,2-bis-(3,5-dimethyl-4-aminocyclohexyl)-propane.

5. A biscyclohexylamine according to claim 1 which is 1,1-bis-(3,5-dimethyl-4-amino-cyclohexyl)-n-butane.

6. A process for the preparation of a biscyclohexylamine of the formula

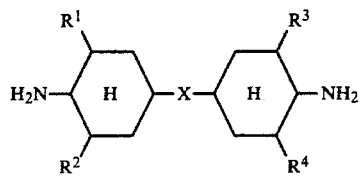

wherein:

R¹ to R⁴ are identical or different alkyl substituents having from 1 to 6 C-atoms and
X is a single bond,
a divalent straight-chain or branched-chain aliphatic group having from 1 to 10 C-atoms,
a divalent cycloaliphatic group having from 6 to 12 C-atoms,
a divalent aliphatic straight-chain or branched-chain group with cycloaliphatic substituents having from 6 to 8 C-atoms,
a divalent straight-chain or branched-chain dialkyl cyclohexane group having from 8 to 12 C-atoms and a divalent straight-chain or branched-chain dialkyl benzene group having from 8 to 12 C-atoms,
which comprises contacting a biscyclohexanol of the formula

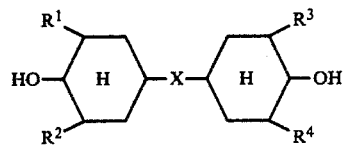

wherein R¹ to R⁴ and X have the previously assigned significance, with ammonia at an elevated temperature and at an elevated pressure in the presence of hydrogen and a nickelchromium based hydrogenation catalyst.

7. A process according to claim 6 wherein the temperature is from 180° to 300° C.

8. A process according to claim 7 wherein the reaction is carried out at a hydrogen partial pressure of from 5 to 50 bar and at an ammonia partial pressure of from 150 to 500 bar.

9. A process according to claim 8 wherein the ammonia and the biscyclohexanol are used in a molar ratio of from 3:1 to 30:1.

10. A process according to claim 6 wherein the biscyclohexanol derivative is one which has been obtained by hydrogenation of a bisphenol represented by the formula

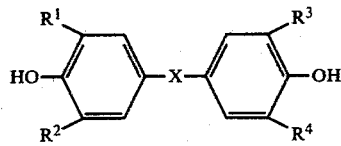

wherein R¹ to R⁴ and X have the previously assigned significance in the presence of a nickel/chromium hydrogenation catalyst without the bisphenol having been isolated or purified.

11. A process for producing 4,4'-diamino-3,3',5,5'-tetraalkyldicyclomethane of the formula

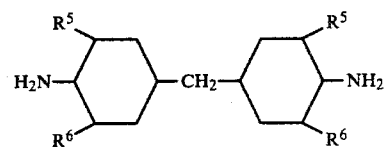

wherein R⁵ and R⁶ may be the same or different and represent alkyl radicals of 1 to 6 carbon atoms which comprises:

(a) condensing at least 1.8 mols of 2,6-dialkylphenol with 1 mol formaldehyde in the presence of oxalic acid and water and thereafter removing water so formed;
(b) hydrogenating the condensation product from step (a) without isolating or purifying the same in the presence of a nickel-chromium catalyst, and
(c) contacting the hydrogenation product of step (b) with ammonia, without isolating or purifying the same, at an elevated temperature and pressure.

12. A process according to claim 11 wherein water formed during the reaction is removed as it is formed.

13. A polyamide obtained by reacting a biscyclohexylamine of the Formula

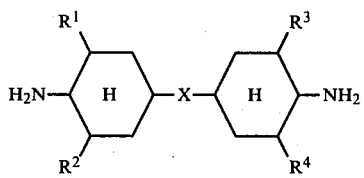

wherein:
$R^1$ to $R^4$ each represent identical or different alkyl groups having 1 to 6 carbon atoms;
X represents a single bond,
a divalent straight-chain or branched-chain aliphatic group having from 2 to 10 carbon atoms,
a methylene group, when at least one of said substituents $R^1$ to $R^4$ has more than 1 carbon atom,
a divalent cycloaliphatic group having from 6 to 12 carbon atoms,
a divalent aliphatic straight or branched-chain group with cycloaliphatic substituents having from 6 to 8 carbon atoms, a divalent straight-chain or branched-chain dialkyl cyclohexane group having from 8 to 12 carbon atoms and a divalent straight-chain or branched-chain dialkyl benzene group having from 8 to 12 carbon atoms with an aliphatic and/or aromatic dicarboxylic acid with up to 16 C-atoms.

14. A biscyclohexylamine according to claim 1 wherein X is a single bond.

15. A biscyclohexylamine according to claim 1 wherein X is a methylene group.

16. A biscyclohexylamine according to claim 1 wherein X is a divalent branched aliphatic group.

17. A biscyclohexylamine according to claim 1 wherein X is an isopropyl group.

18. A polyamide according to claim 13 wherein X is a single bond.

19. A polyamide according to claim 13 wherein X is a methylene group.

20. A polyamide according to claim 13 wherein X is a divalent branched aliphatic group.

21. A polyamide according to claim 13 wherein X is an isopropyl group.

22. A polyamide according to claim 13 wherein said dicarboxylic acid is adipic acid, sebacic acid, decane dicarboxylic acid, dodecane dicarboxylic acid, azelaic acid, terephthalic acid and isophthalic acid.

* * * * *